United States Patent [19]

Harken

[11] 4,453,486
[45] Jun. 12, 1984

[54] CAM CLEAT

[75] Inventor: Peter O. Harken, Pewaukee, Wis.

[73] Assignee: Vanguard, Inc., Pewaukee, Wis.

[21] Appl. No.: 459,752

[22] Filed: Jan. 21, 1983

Related U.S. Application Data

[63] Continuation of Ser. No. 286,792, Jul. 27, 1981, abandoned, which is a continuation of Ser. No. 097,715, Nov. 27, 1979, abandoned, which is a continuation of Ser. No. 951,502, Oct. 16, 1978, abandoned, which is a continuation of Ser. No. 824,332, Aug. 15, 1977, abandoned.

[51] Int. Cl.$^3$ .............................................. B63B 21/08
[52] U.S. Cl. ................................. 114/218; 24/132 R; 24/134 KB
[58] Field of Search ............. 114/199, 218; 24/134 R, 24/134 L, 134 KB, 134 P, 132 R, 132 WL, 133; 308/174, 219

[56] References Cited

U.S. PATENT DOCUMENTS

| | | | |
|---|---|---|---|
| 1,181,407 | 5/1916 | Ringland | 308/174 |
| 3,168,359 | 2/1965 | Murphy | 308/174 |
| 3,265,032 | 9/1966 | Hume | 114/218 |
| 3,765,061 | 10/1973 | Nash | 114/218 X |

Primary Examiner—Sherman D. Basinger
Attorney, Agent, or Firm—Gary, Juettner & Pyle

[57] ABSTRACT

A cam cleat includes a pair of spring loaded cams or pawls rotatably mounted on a base. The cams have specially formed teeth and open and close in opposite rotary directions to releasably grip a line therebetween. The cams or pawls are rotatably mounted on a shaft and the case by a plurality of rotatable bearings to substantially reduce the effort required in opening and closing the cams and to reduce the spring force maintained on the cams, resulting in substantial advantages in performance. An alternate single cam version is also disclosed.

29 Claims, 14 Drawing Figures

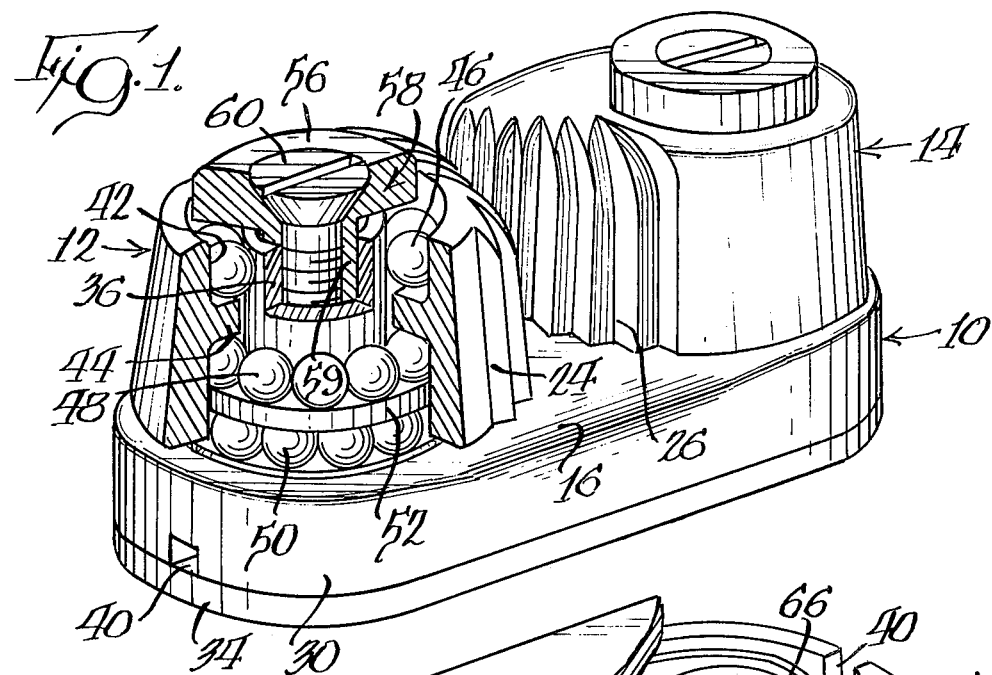
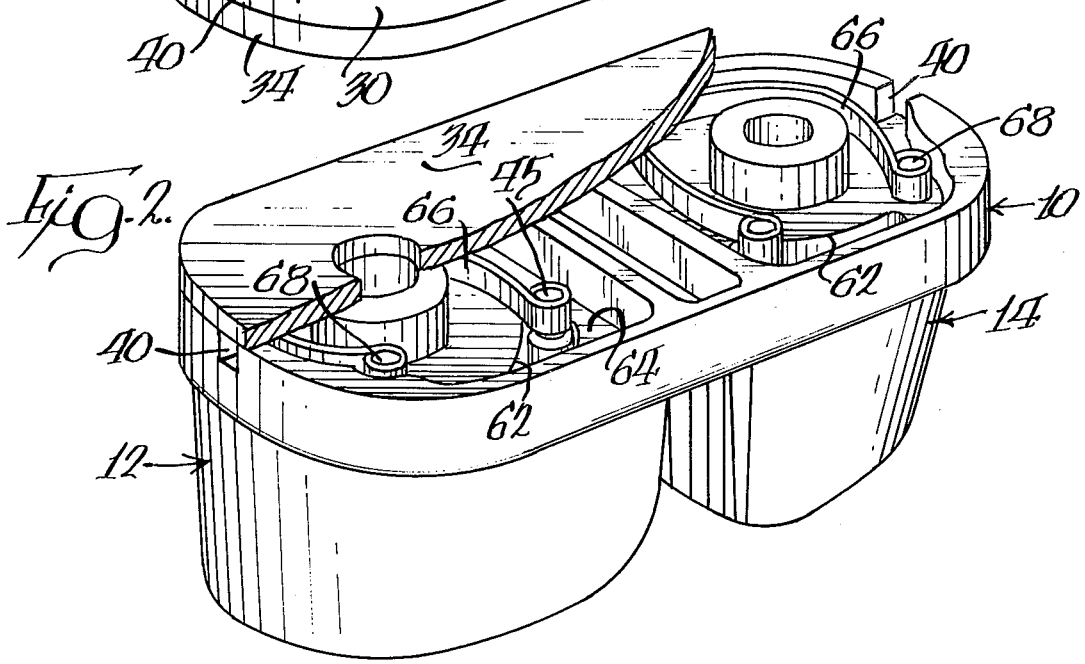
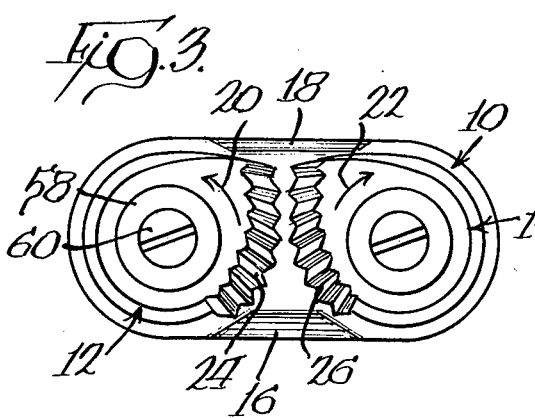
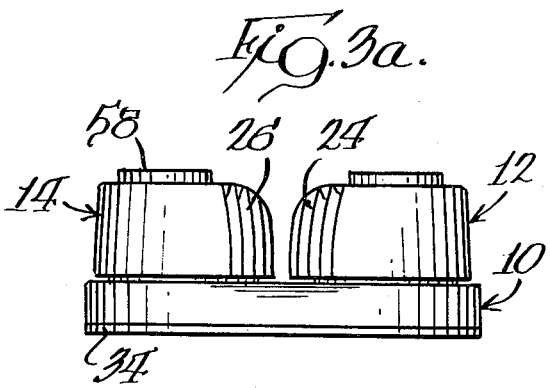

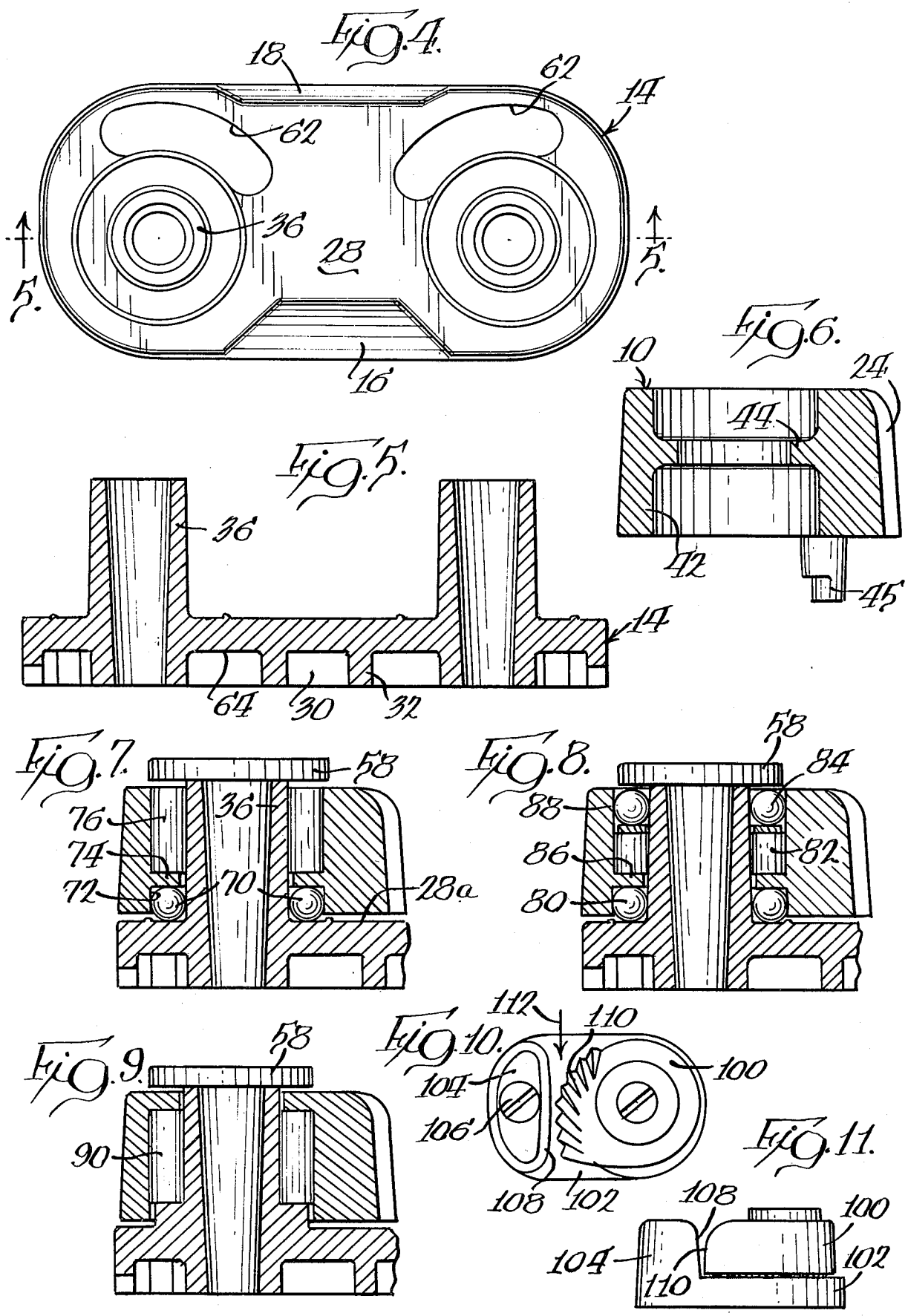

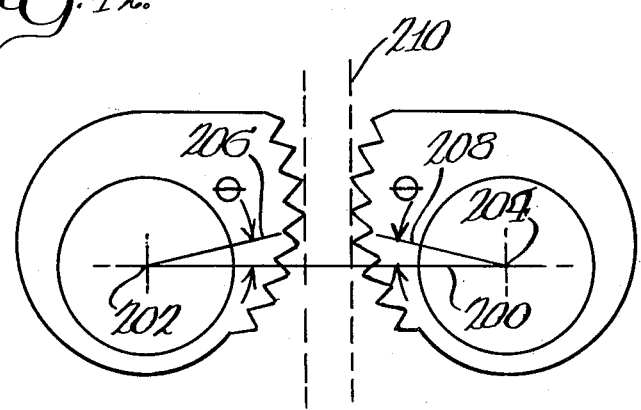
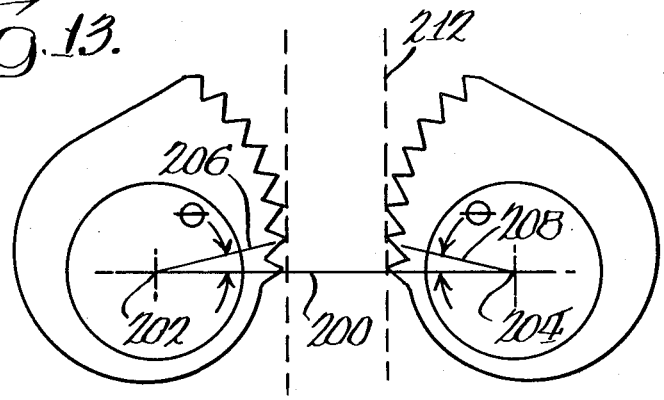

4,453,486

CAM CLEAT

CROSS REFERENCE

This a continuation of application Ser. No. 286,792 filed July 27, 1981, which is a continuation of application Ser. No. 097,715, filed Nov. 27, 1979, which is a continuation of application Ser. No. 951,502, filed Oct. 16, 1978, which is a continuation of application Ser. No. 824,332, filed Aug. 15, 1977 all of said prior applications now abandoned.

BACKGROUND OF THE INVENTION

The present invention relates to improvements in line securing devices known as cam cleats, which are widely used to secure line on sailing craft due to the ability of such devices to carry high loads and to quickly secure and release a line. The device includes a pair of facing pawls that are rotatably mounted on a shaft and spring loaded in opposite rotary directions, whereby the pawls are urged toward each other in a closed position. The facing surfaces of the pawls bear teeth, and said surfaces have a gradually decreasing radius from the shaft such that the distance between pawls is increased when rotated from a closed to an open position. Thus, a line inserted between the pawls may be pulled between the teeth in the open direction, but the pawls close to grip or clamp the line when pull is exerted in the opposite direction, in effect providing a unidirectional self-locking mechanism. The line is quickly released from engagement between the pawls by a quick pull away from the pawls and is quickly engaged by pulling of the line between the pawls.

In prior art cam cleats the cams or pawls have been swingably mounted on a vertical cylindrical shaft extending upward from a base. The cams each include a vertical cylindrical bore to receive the shaft, whereby the cam is journaled on the shaft in the manner of a sleeve bearing.

If the cam cleat is to be used on a wide variety of sail craft, the cleat must be able to accommodate a variety of line diameter. In addition, the cleat must be operative to accommodate both light and heavy loads.

There are several disadvantages in the use of a conventional cam cleat when variable loads are placed on the line. Heretofore, very strong or high tension springs have been used to rotate the cam toward a closed position to overcome the friction between the cam and its shaft, thereby to prevent slipping of the line toward the loaded direction or to prevent accidental release. The use of such heavy springs resists opening of the pawls and increases the effort required to engage the line. Under high loads, considerable lateral forces are exerted from the line to the sleeve bearing surfaces of the cam and shaft, greatly increasing rotational friction and making it difficult to disengage the line from a locked position. The necessity to accommodate high loads also requires the use of springs which are sufficiently heavy to overcome the increased friction, whereby the pawls will continue the grip the line.

Another inherent drawback of prior art cam cleats is the necessity to use pointed teeth having a radius of less than 0.01 inches on the line engaging surfaces of the pawls. Under heavy loads, a situation may be encountered where the rotary friction on the pawl exceeds the spring force utilized to urge the pawl toward a closed position. At this stage, the line, which has been squeezed to a reduced diameter, would tend to slip. For this reason, sharp teeth have to be utilized to create additional friction against slipping. The pointed teeth tend to abraid or shred the line under heavy loads and many cam cleats therefore have the reputation of being "line eaters."

SUMMARY OF THE INVENTION

I have discovered that the turning friction of the pawls in a cam cleat play a critical role in the overall operation thereof, particularly under highly variable loads and mounting positions encountered in sailing. By substantially reducing the friction between the pawls and their associated shafts, the spring force utilized to return the pawls to a closed position may be substantially less than required in a conventional cam cleat. As a result, engaging and disengaging the line to and from the cleat is greatly facilitated, and the reliable performance of the cleat under heavy loads is assured.

In the cam cleat of the present invention, a plurality of rotatable bearings are provided between the shaft and its associated cam. Ball or roller bearings or a combination thereof may be employed and preferably several rows of bearings are utilized to distribute the load. Spring means are provided in the base to urge each pawl toward its closed position.

Another desirable feature of the present invention is that rounded teeth may be used on the facing surfaces of the cams, thereby virtually eliminating line wear. Under heavy loads, the rotary friction on the pawl is not substantially increased, and the cams can easily continue to rotate toward a closed position and firmly grip the line without the necessity of using pointed teeth to increase drag friction.

Another embodiment of the invention comprises a single cam mounted upon a base having an upstanding wall opposing the working surface of the cam.

Other features and advantages will become apparent from the following description.

THE DRAWINGS

FIG. 1 is a perspective view of the cam cleat of the present invention, with portions broken away to reveal inner structure.

FIG. 2 is a perspective view from the bottom of the cam cleat shown in FIG. 1, a portion of the base plate being removed to reveal inner structure.

FIG. 3 is a plan view of the cam cleat shown in FIGS. 1 and 2.

FIG. 3a is an elevational view of the cam cleat shown in FIG. 3.

FIG. 4 is a plan view of the base and shaft portion of the cam cleat of the present invention.

FIG. 5 is a vertical sectional view taken along line 5—5 of FIG. 4.

FIG. 6 is a vertical sectional view of one of the pawls.

FIGS. 7, 8 and 9 illustrate a fragment of the base and shaft unit shown in FIG. 5 and additionally show alternate bearing systems which may be utilized.

FIG. 10 is an elevational view of another version of the cam cleat of the present invention utilizing a single cam and a relatively stationary surface between which a line may be engaged.

FIG. 11 is a side view of the embodiment shown in FIG. 10.

FIGS. 12 and 13 are plan views of the cam cleats accepting various line sizes.

DESCRIPTION OF THE PREFERRED EMBODIMENTS

FIGS. 1, 2, 3 and 3a generally illustrate the first preferred embodiment of the cam cleat of the present invention, which comprises an oval or rectangular base 10 upon which a pair of cams or pawls 12 and 14 are swingably mounted. With reference to FIG. 3, the pawls of the cam cleat operate in the conventional fashion, in which of line (not shown) is forced between the pawls 12 and 14 from the entrance side 16 to the exit side 18 of the cleat (FIG. 3), whereby the pawls rotate in the opposite directions indicated by the arrows 20 and 22. The pawls 12 and 14 are mirror images of one another and bear facing toothed surfaces 24 and 26. The surfaces 24 and 26 are arranged on curves relative to the respective axes of rotation of each pawl, said curves having a maximum radius at the entrance side 18 and decreasing to a minimum radius at the exit side.

As the pawls 12 and 14 are opened in the direction of arrows 20 and 22, the distance between the toothed surfaces gradually increases to enable a rope or line of a particular thickness to be received. Spring means, as will be hereinafter described, resiliently urge the pawls toward a closed position, i.e., opposite to the direction of arrows 20 and 22.

A line engaged in the cleat may be pulled toward the exit side 18, but pulling in the opposite direction causes the distance between the cams to decrease whereby the line is griped or clamped therebetween. In order to allow the line to move toward the entrance side 16, the free end must be pulled away from the base 10 and out of engagement between the pawls.

From the foregoing description, it will be understood that if a line is engaged in the cam cleat and placed under high load, the line is pinched and considerable lateral forces are exerted on the rotary bearing surfaces of the cams. This friction makes it difficult to open the cams such as when additional line must be drawn in or when the line is to be released. The friction in the cam bearing surfaces also dictates the use of a heavy return spring, in order to assure proper gripping of the line when initially engaged and to continue to grip the line as the load is substantially increased.

An important feature of the present invention resides in reducing the rotational friction of the cams and distributing the load uniformly over a large surface area. This is accomplished by providing a plurality of rotatable bearings, such as ball bearings or roller bearings, between the pawl and its associated shaft. Needle bearings may also be used as well as bearings in cages but are less preferable. Performance is further improved by providing bearing means at the top wall of the pawl and between the pawl and the base, whereby the pawl rides entirely on bearings.

Referring to FIGS. 1, 2, 4 and 5, the base 10 may be made of plastic or metal such as die cast aluminum and includes a lower web 28 with a continuous side wall 30 encircling and extending downward therefrom, together with reinforcing webs 32 connected between the web and side wall to define a downwardly open, cavity-bearing box structure. The bottom of the base is covered with a conforming strip 34 of resilient material to enclose the cavities in the base and to cushion the cleat on the surface to which it is mounted. The strip 34 also retains the spring 66 for the cam, as will be hereinafter described.

A pair of tubular posts 36 and 38 are provided at right angles to the web 28 and may be formed as an integral part of the base, as shown in FIG. 5, said posts extending to the bottom surface of the base. The upper surface of web 28 may be slightly depressed at the entrance side at 16 to facilitate engagement of the line. Also, one or more holes 40 may be provided in the side wall 30 to permit water drainage.

Referring to FIGS. 1, 5 and 6, the bearing system of pawl 12 will now be described, it being understood that the bearing system of pawl 14 is identical and need not be described in detail. It may be seen in FIG. 1 and 6 that the pawl 12 has a cylindrical cavity 42 therein around the rotary axis A—A thereof (FIG. 6), said cavity being interrupted by a washer shaped transverse web 44 positioned at approximately two-thirds of the distance from the bottom to the top of the cavity. It will also be noted that a pin 45 depends from the base of the pawl 12, the purpose of which is to engage a spring, as will be hereinafter described.

In the preferred embodiment, the cavity 42 and web 44 are designed to accommodate three separate sets or rows of ball bearings, which will be designated herein as upper set 46, intermediate set 48 and lower set 50. These three sets are shown in FIG. 1, and it will be understood that each set includes a plurality of individual balls arranged generally in a circle, the balls being somewhat loosely spaced to prevent binding between balls. These balls are preferably made from a wear and distortion resistant polymeric material which is non-corrosive, and the pawls may be made from molded polymer but preferably are made of die cast aluminum that may be impregnated with polyfluroethylene.

The lower ball set 50 is disposed radially between the shaft or post 36 of the base 10 and the lowermost portion of the cylindrical cavity 42 of the pawl, said set also bearing between the upper surface of the base web 28 and the lower surface of a washer 52 loosely disposed around the post and being spaced from said cylindrical cavity. As best shown in FIGS. 4 and 5, a circular boss 54 may be provided in the base web 28 around the post 36 to retain the lower ball set during assembly.

The intermediate ball set 50 is also radially disposed and bears between post 36 and cavity 42. In addition, the intermediate set bears between the washer 52 and the lower annular surface of the transverse web 44.

The upper set 46 also bears between the post 36 and cavity 42. In addition, the upper set bears between the upper surface of transverse web 44 and the lower annular surface of the head 56 of a top retainer 58. The top retainer 58 has an enlarged cylindrical head 56 that substantially covers the top of the pawl cavity, and a cylindrical stem 59 depending therefrom and being press fitted into the open end of the post 36.

The retainer 58 has an axial bore therethrough, and a bolt 60 may be pressed through the bore in the retainer and post 36 to enable secure attachment of the cam cleat to the desired surface. The retainer 58 also serves the useful function of holding the ball assemblies together independently of the securement of the bolt, which is not true of many types of conventional cam cleats.

It may be seen by the foregoing arrangement that the stationary parts of the cam cleat are entirely isolated or spaced from the cams by ball bearings such that there is no rubbing between stationary and moving parts. It may also be seen that the ball bearing sets carry and distribute all possible loads, upward, downward, and lateral, while allowing substantially frictionless rotation of the pawls.

While the foregoing bearing arrangement is preferred, it will be apparent that either or both of the upper and lower ball sets could be eliminated while still retaining a substantial degree of frictionless operation. Also, it is possible to substitute roller bearings for some or all of the bearing sets, as shown in FIGS. 7, 8 and 9.

As shown in FIG. 7, the bearing system may comprise a lower ball bearing set 70 bearing between the base 28a, cam surface 72, cam web 74, and post 36a. The upper bearing system may comprise roller bearings 76 bearing between the post 36a, web 74, and cam surface 72. The arrangement shown may also be inverted if desired.

As shown in FIG. 8, the bearing system may include a lower ball set 80, an intermediate roller set 82 and an upper ball set 84, said sets being separated by washers 86 and 88 or by webs extending inward from the pawl.

FIG. 9 illustrates the alternative of using a single set 90 of roller bearings, which serve primarily to accommodate lateral forces. Although the roller bearings shown are cylindrical, the structure may be modified to utilize tapered roller bearings and a plurality of sets of roller bearings.

Referring now to FIGS. 2, 4, 5 and 6, means are provided in the base 10 to yieldingly urge each of the pawls toward a closed position. The base web 28 has a pair of arcuate slots 62 therein (FIG. 4) through which the depending pin 45 from each pawl may extend. A cavity 64 is provided beneath the base web around the lower end of the post 36 to receive a U-shaped leaf spring 66. One end of the spring 66 is connected to the pawl pin 45 and the other end is connected to a second pin 68 on the base which is placed at the other side of the cavity. The spring 66 is installed under tension such that the pawls are always urged toward a closed position. The maximum arc of movement of the pawl is determined by extent of the arcuate slot 62, the ends of which define stops for the pin 45.

The springs 66 are advantageously placed in a separate compartment in the base, said feature allowing the springs to be removed or replaced without disassembling the bearing assembly.

It may be seen that as the pawls are rotated toward an open position, the springs 66 are stretched and flexed around the bottom portion of the posts, said posts thereby preventing binding of the springs, and said springs are preferably arranged so as to be spaced from the base to prevent undesirable friction.

Another feature of the invention is the configuration of the teeth 18 on the pawls, as shown in FIGS. 1, 3, 4 and 6. The teeth include a lower major portion that is substantially straight and substantially at a right angle to the base, although an angle between facing teeth of from about 2 to about 15 degrees is generally desirable for proper operation.

The upper portion of the teeth which initially receive the line are flared outwardly as shown in FIG. 3a and are also swept toward the exit side of the cleat as shown in FIGS. 1 and 3. The contour of the upper portion of the teeth is in the form of a spiral with no broken lines or corners. These features, together with the frictionless operation and light spring load required, facilitate engagement of the line and also prevent accidental engagement if the line is dragged back and forth across the top of the cleat.

Another important feature of the invention is the use of a tooth profile that will not shred the line. Prior art cam cleats have utilized teeth having a maximum radius of about 0.01 inches and usually less, which results in shredding of the line. In the cam cleat of the present invention, it is possible to use more rounded teeth than heretofore considered possible. I have found that undesirable shredding of the line will be substantially reduced if the radius of the teeth exceed 0.015 inches, and a useful range of radii is from 0.015 to 0.040 inches, the use of which is rendered possible by the improved bearing system herein described.

Another embodiment of the invention is shown in FIGS. 10 and 11. Whereas the previous embodiments included a pair of pawls, the present embodiment comprises a single cam or pawl 100 rotatably or swingably mounted on a base 102 by means of one of the rotatable bearing systems herein described. The base 102 includes an upstanding lug 104 which is formed integrally with the base or otherwise suitably attached thereto. A bolt 106 or the like is used to secure the lug portion of the base 102 to an underlying support.

The lug 104 includes a wall 108 that is substantially perpendicular to the base 102, said wall being slightly spaced from the major toothed surface 110 of the pawl 100. The surfaces 108 and 110 are parallel or somewhat divergent from the base 102, whereby a line introduced from the direction of the arrow at 112 will be gripped and locked against movement in the opposite direction.

The foregoing version of the cam cleat shown in FIGS. 10 and 11 are especially useful for control of lines which are infrequently used or wherein the possible angle of entry of the line into the device is not too variable. Engagement and release of the line is similar to that described in connection with the previous embodiments with the exception that one of the gripping surfaces is relatively stationary.

Another important feature of the present invention is the curved shape or outline of the working or line engaging surfaces of the cams, such surfaces being identified as FIGS. 24 and 26 in the Figures.

As shown in FIGS. 12 and 13, the curvature of the cam working surfaces is defined such that the cam angle remains substantially constant, i.e., within about one degree for the entire range of line thickness or diameters to be engaged by the cams. The "cam angle" is defined as the angle $\theta$ between a line 200 through the centers 202 and 204 of rotation of both cams (perpendicular to the rope in the cams) and a line 206 and 208 from a center of rotation to the point on the cam surface that is in contact with the line being used.

FIGS. 12 and 13 illustrate that the cam angle as above defined remains substantially constant regardless of whether the line has a relatively small diameter, as shown at 210 in FIG. 12, or a relatively large diameter, as shown at 212 in FIG. 13. In order to assure proper gripping, it has been found that the cam angle should be a substantially constant value within the range of from 10 to 19 degrees.

The outline curvature of the working surface approximates a segment of a circle having an offset center of rotation. Relative to the center of rotation, the radius (R) of the curve at any given angle of rotation is defined by the following formula:

$$R = R_0 \, e^{(\tan\theta)\alpha}$$

where:

α is the degree of rotation of the cam from its initial position;
$R_o$ is the initial or minimum radius of the cam or radius at α=0;
θ is the constant cam angle as herein defined; and
e is the natural logarithm base equal to approximately 2.71828.

The cam surface described above is one that requires a minimal amount of cam rotation to cleat a useful range of line diameter, assuming a minimum allowable coefficient of friction between the rope and the pawl surface.

I claim:

1. In a cam cleat having at least one cam-shaped pawl swingably mounted on a shaft for gripping a line, the improvement comprising a cylindrical cavity between said shaft and said pawl, said cavity defining spaced bearing surfaces on said shaft and said pawl, and a plurality of rotatable bearings disposed in said cavity and bearing between said shaft and said pawl, whereby to reduce rotational friction between said pawl and said shaft, to reduce the effort required to grip said line, and to reduce the effort required to engage and disengage the line from the cleat.

2. The cam cleat of claim 1 wherein said rotatable bearings comprise a set of ball bearings disposed in a circle in said cavity around said shaft.

3. The cam cleat of claim 2 wherein a plurality of sets of ball bearings are disposed around said shaft.

4. The cam cleat of claim 2 comprising a pair of said pawls mounted on respective shafts.

5. The cam cleat of claim 4 wherein said pawls have a cam angle defined as a constant angle equal to the angle between a line passing between the rotational axes of the pawls and a second line from an axis to a point where the pawl surface engages the line, said angle being within the range of 10 to 19 degrees.

6. The cam cleat of claim 2 comprising a single cam and a retaining wall spaced from said cam for gripping a line therebetween.

7. The cam cleat of claim 1 wherein said bearings comprise roller bearings disposed around said shaft, said bearings having axes parallel to said shaft.

8. The cam cleat of claim 1 further comprising a base having a wall supporting said shaft on one side thereof, a cavity in said base on the other side of said wall, and means in said cavity for resiliently urging said pawl in one rotational direction.

9. The cam cleat of claim 1 wherein said rotatable bearings are composed of polymeric materials.

10. A cam cleat comprising at least one cam-shaped pawl, tubular post means for rotatably supporting said pawl, said pawl being swingable around said post from a closed position to an open position relative to a second surface for releasably retaining a line, an annular cavity between said post means and an internal surface of said pawl, and a plurality of rotatable bearing means disposed in said cavity and providing rotary bearing means for said pawl.

11. The cam cleat of claim 10 wherein a plurality of said annular cavities are provided and wherein a set of rotatable bearing means is provided in each cavity.

12. The cam cleat of claim 10 wherein said rotatable bearing means comprise ball bearings.

13. The cam cleat of claim 10 wherein one set of rotatable bearing means comprises ball bearings and a second set thereof comprises roller bearing means.

14. The cam cleat of claim 10 wherein a base is provided for supporting said post means, and said bearing means rotatably bear against said base.

15. The cam cleat of claim 10 wherein a retainer is provided on the end of said post means and the bearing means rotatably bear against said retainer.

16. The cam cleat of claim 10 wherein a base is provided for supporting one end of said post means, said base providing a first bearing surface, a retainer at the other end of said post means defining a second bearing surface, means defining three annular cavities between said pawl and said post means, a set of rotatable bearing means in each of said cavities, one set also bearing against said first bearing surface, another set also bearing against said second bearing surface.

17. The cam cleat of claim 10 further comprising spring means for urging said pawl toward said closed position.

18. The cam cleat of claim 10 wherein the cleat comprises a pair of cam-shaped pawls rotatable in opposite directions.

19. The cam cleat of claim 10 wherein the cleat comprises a single cam-shaped pawl and a relatively stationary wall adjacent said pawl.

20. A cam cleat comprising a base, a pair of spaced posts extending from said base, a pair of cam-shaped pawls swingably mounted around said posts, said pawls being rotatable in the same direction to present an increasingly greater distance therebetween from a closed position to an open position, an axial opening through each pawl defining a cylindrical bearing surface spaced from said post, a first set of a plurality of rotatable bearing means between said cylindrical surface and said post, and means for retaining said bearing means for rotatably supporting said pawl.

21. The cam cleat of claim 20 wherein facing surfaces of said pawls have teeth substantially parallel to the axis of rotation thereof, a major length of said teeth adjacent said base being substantially straight, a minor portion of said teeth remote from said base being diverged outwardly from said major portion in a first angle and swept in a second angle from said major length in a spiral configuration.

22. The cam cleat of claim 20 wherein a transverse annular web is provided from said cylindrical surface of said pawl, one side of said web supporting said first set of said bearing means.

23. The cam cleat of claim 20 wherein a second set of rotatable bearing means are disposed between said cylindrical surface and said post, said second set also bearing on said base, and means for holding said first and second sets at separate adjacent levels around said post.

24. The cam cleat of claim 23 wherein the means for holding said first and second sets is a washer disposed between said first and second sets.

25. The cam cleat of claim 23 wherein a third set of rotatable bearing means are disposed between said cylindrical surface and said post, and means for holding said first and third sets at separate adjacent levels around said post.

26. The cam cleat of claim 25 wherein said rotatable bearing means comprise ball bearings.

27. The cam cleat of claim 20 wherein said pawls have facing, line engaging surfaces bearing teeth, and wherein the radius of said teeth are within the range of 0.015 to 0.040 inches.

28. The cam cleat of claim 20 wherein resilient means are associated with said pawls for urging said pawls toward a closed position.

29. The cam cleat of claim 20 further comprising base means for supporting said posts on one side thereof, an arcuate slot in said base means, a member projecting from said pawl and extending through said slot, and resilient means comprising a spring engaged under tension between said member and said base means, said resilient means being located at the other side of said base means.

* * * * *